(No Model.) 5 Sheets—Sheet 1.
W. R. BACON.
APPARATUS FOR CUTTING OR DIVIDING CARD BOARD OR PASTEBOARD.
No. 357,445. Patented Feb. 8, 1887.
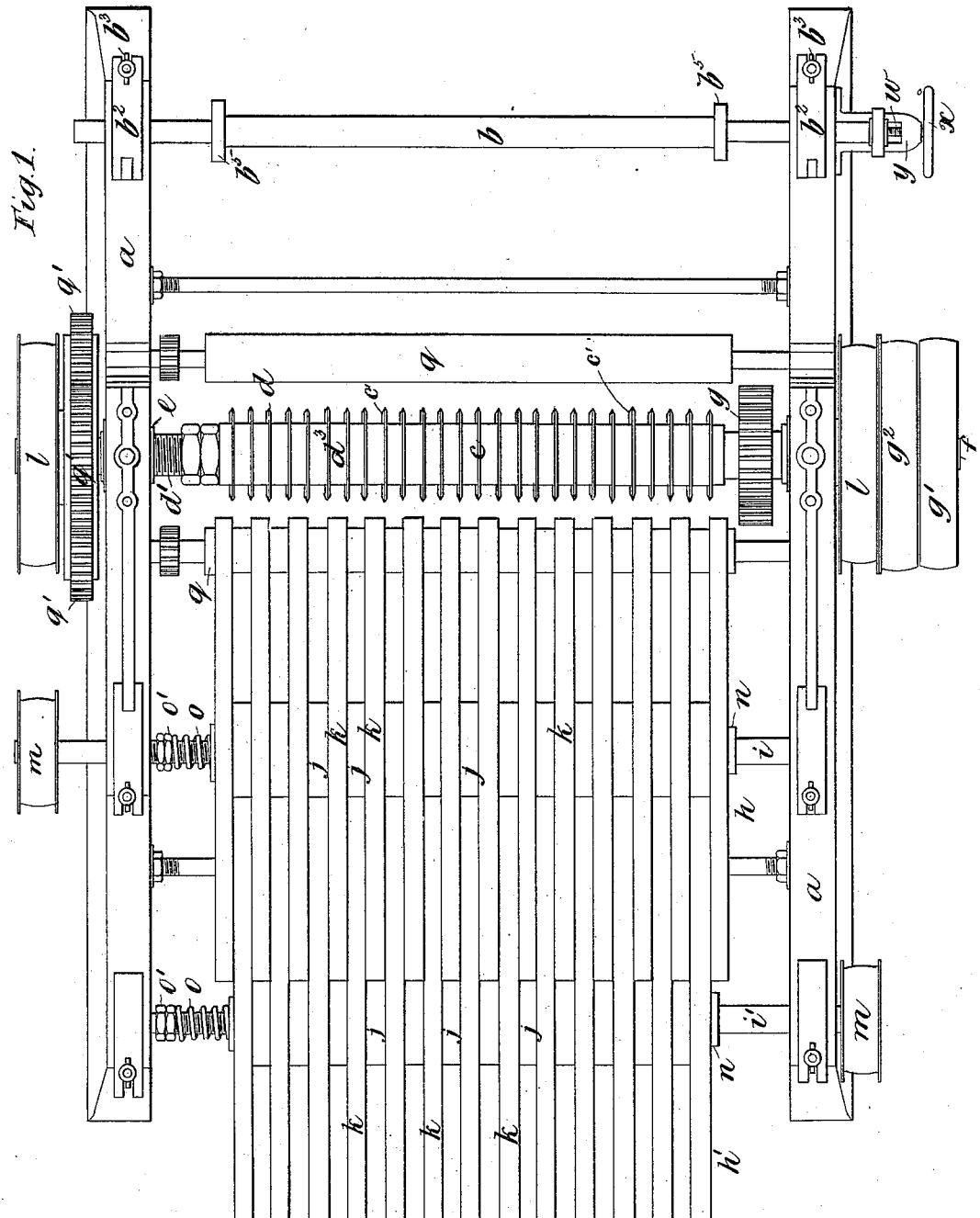

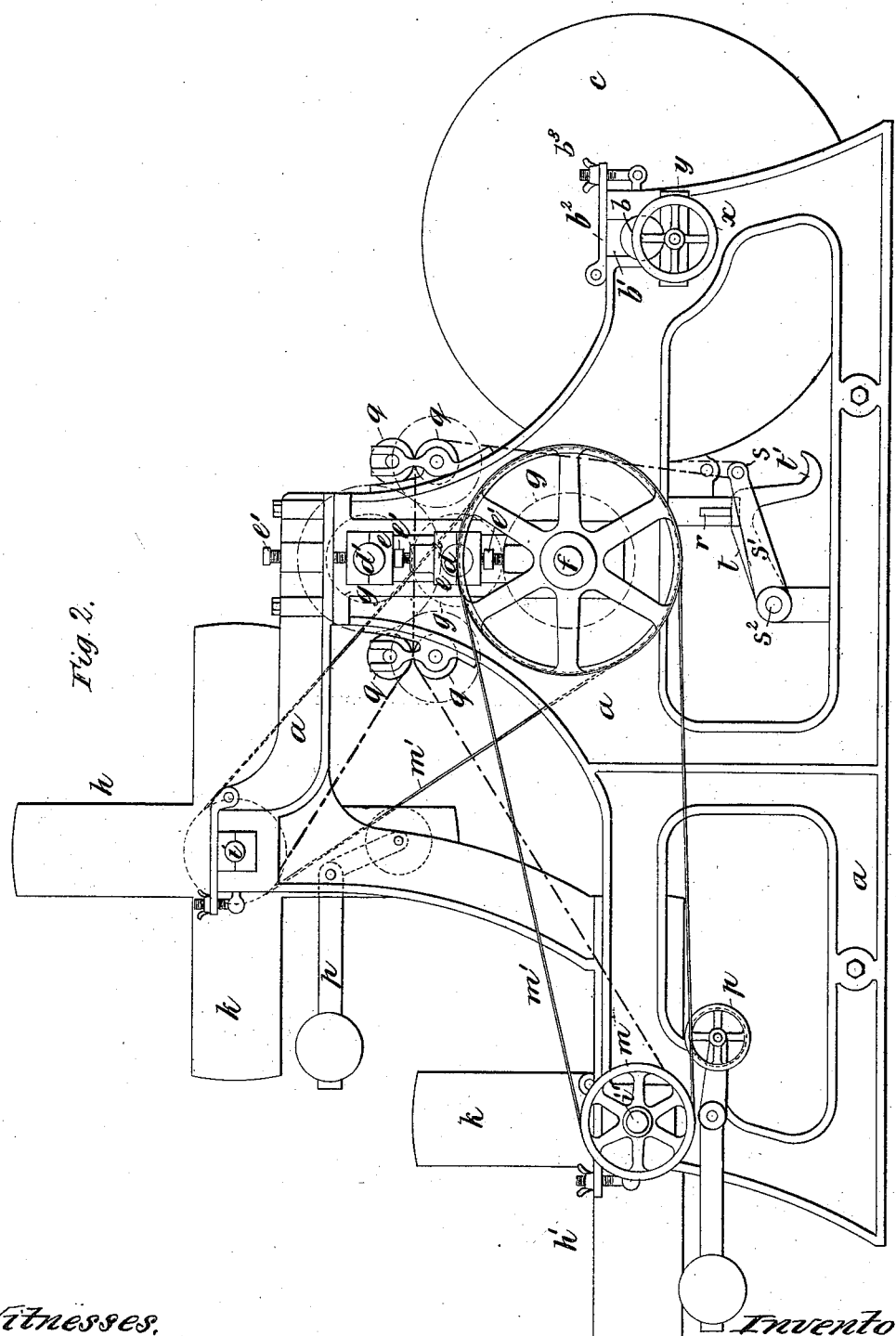

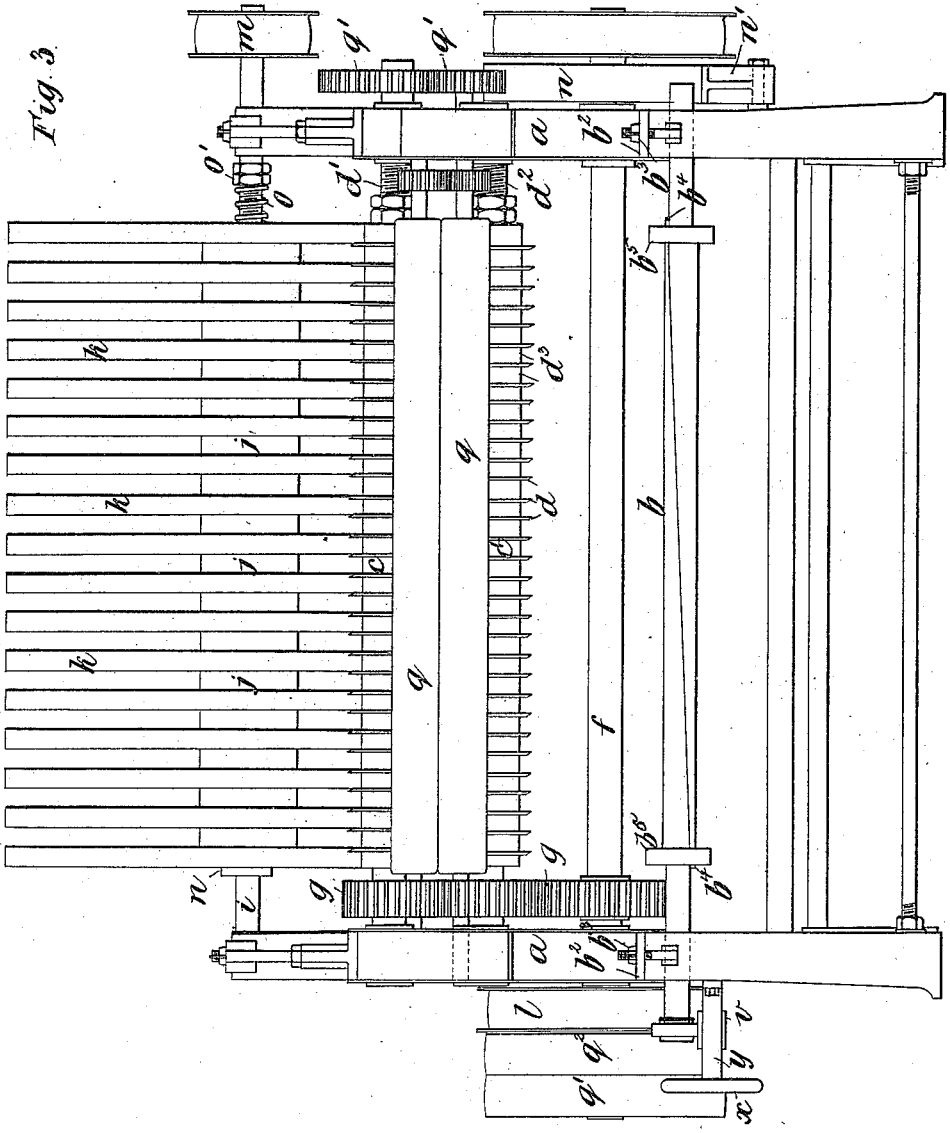

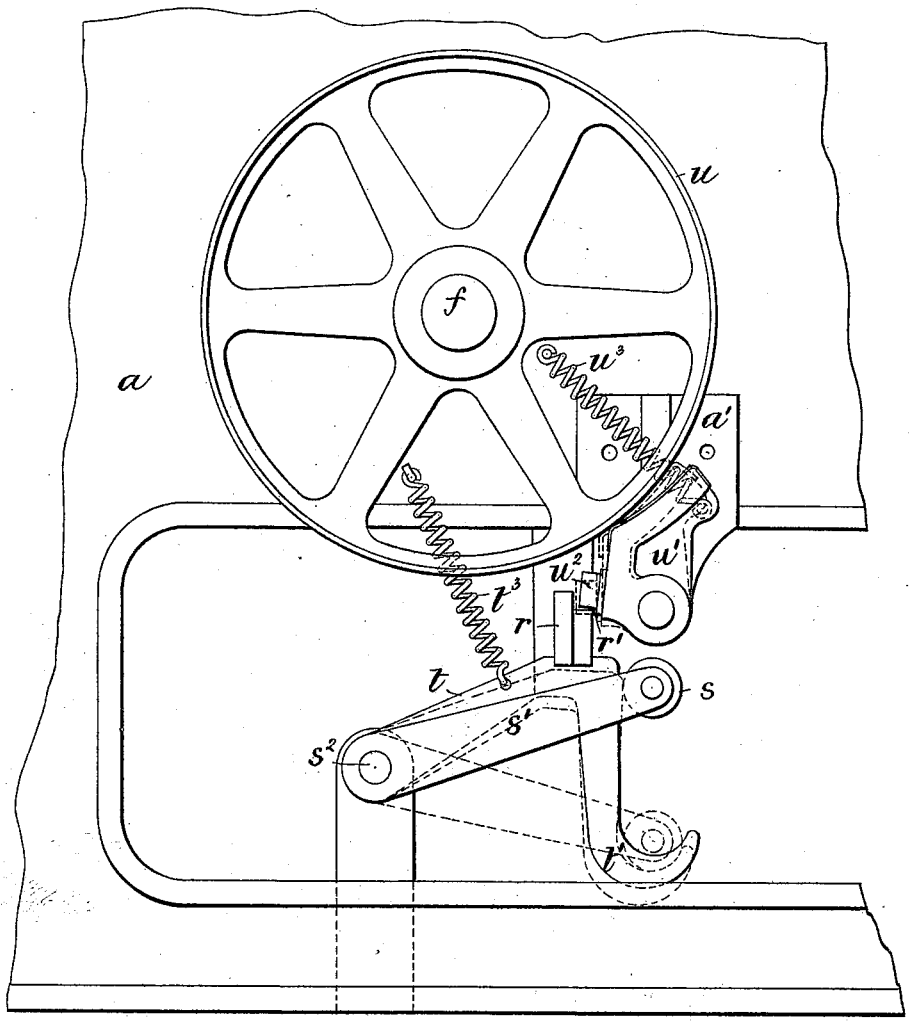

(No Model.) 5 Sheets—Sheet 5.
W. R. BACON.
APPARATUS FOR CUTTING OR DIVIDING CARD BOARD OR PASTEBOARD.
No. 357,445. Patented Feb. 8, 1887.
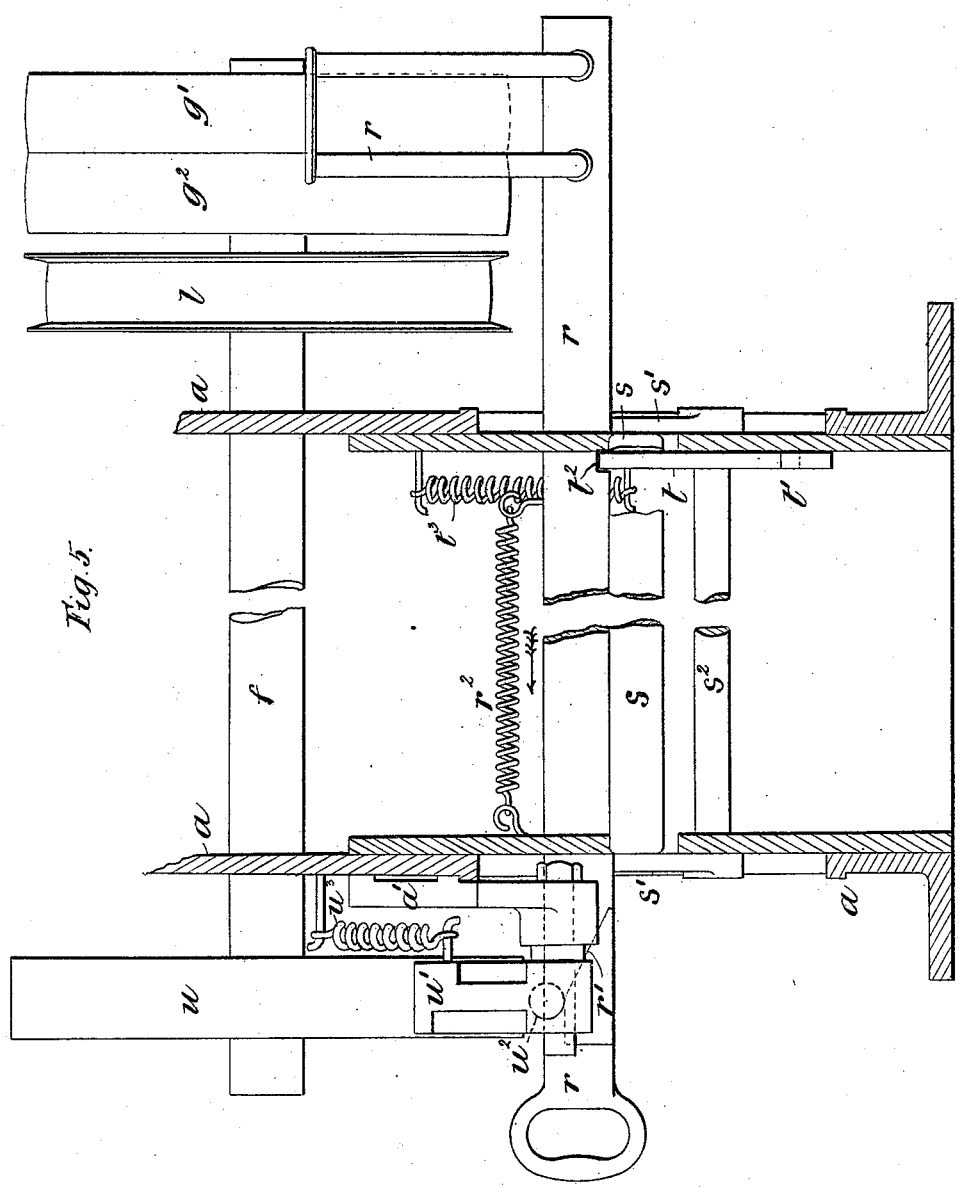

UNITED STATES PATENT OFFICE.

WALTER RATHBONE BACON, OF LONDON, ENGLAND.

APPARATUS FOR CUTTING OR DIVIDING CARD-BOARD OR PASTEBOARD.

SPECIFICATION forming part of Letters Patent No. 357,445, dated February 8, 1887.

Application filed April 24, 1886. Serial No. 200,052. (No model.)

*To all whom it may concern:*

Be it known that I, WALTER RATHBONE BACON, a citizen of the United States of America, and a resident of London, England, have invented new and useful Improvements in Apparatus for Cutting or Dividing Card-Board or Pasteboard, of which the following is a specification, reference being had to the accompanying drawings.

My invention relates to apparatus chiefly designed for use in the manufacture of tickets, for cutting sheets or lengths of card-board or similar material into a series of longitudinal strips and winding the same upon reels or bobbins.

In the accompanying drawings, Figure 1 is a plan of the improved apparatus. Fig. 2 is a side elevation of the same, and Fig. 3 is an end elevation. Figs. 4 and 5 are side and end elevations, respectively, drawn to an enlarged scale, of the automatic stopping apparatus hereinafter described.

Like letters of reference indicate corresponding parts in all the figures of the drawings.

$a$ is the main frame upon which the several parts of the apparatus are mounted.

$b$ is the shaft carrying the card-board $c$ to be cut into strips. This shaft $b$ is carried in bearings $b'$, having hinged caps $b^2$, secured by screws $b^3$, so that by loosening the said screws the cap may be thrown back and the shaft removed from its bearings.

In order to facilitate the introduction of the shaft $b$ into the roll of card-board or the like, it is made in two parts, as shown in Fig. 3, one end, $b^4$, of each part being inserted into a correspondingly-shaped aperture in a collar, $b^5$, on the other part. These collars also serve to prevent the roll of card-board from moving laterally upon the shaft. In placing the shaft in a roll of card-board the two parts are separated and introduced into the center of the roll, one from each side, and then connected, as before described.

$c\ c'$ are rotary cutters for dividing the card-board, which cutters are each composed of a number of disks, $d$, mounted upon the shafts $d'\ d^2$, respectively. Washers $d^3$ are placed between the disks and serve to keep them at the proper distances apart. The peripheries of the disks are beveled to form cutting-edges. The two cutters are placed in such positions relatively to each other that their disks slightly overlap and are in contact at their cutting-edges. In order to be able to adjust the said cutters they are carried in bearings $e$, which slide in slots in the frame $a$. Set-screws $e'$, placed above and below the said bearings, serve for adjusting the cutters.

The cutters $c\ c'$ are operated from the shaft $f$ through suitable gearing, $g$. The shaft $f$ is provided with the fast and loose pulleys $g'\ g^2$, so that it may be driven by means of a belt from any suitable motor.

$h\ h'$ are reels, upon which the strips of card-board are wound after leaving the cutters. The said reels are mounted on shafts $i\ i'$, respectively, and are each composed of a number of disks, $j$, forming cores for the rolled strips, alternating with guiding-pieces $k$. These reels are arranged in different planes, and are each adapted to wind half the number of strips cut by the cutters. One reel, $h$, winds every alternate strip, and the other reel, $h'$, winds the intermediate strips. Motion is imparted to the reels from the shaft $f$ by means of the pulleys $l\ l$ thereon, the pulleys $m\ m$ on the shafts of the reels, and belts $m'\ m'$ running around the said pulleys.

The disks $j$ and pieces $k$ are held upon their shafts between collars $n$ and springs $o$, the pressure of the said springs being regulated by means of nuts $o'$, so that under normal conditions the disks rotate with their shafts. If, however, during winding the diameter of one roll should be greater than another, (for instance, owing to the greater thickness of card-board at one part than at another,) thereby tending to wind the strip more rapidly than the other strips, the disk or core upon which the said strip is wound will slip upon its shaft, thus preventing the breaking or tearing of the card-board.

$p\ p$ are tension devices which bear against the belts $m'\ m'$, to prevent them from slipping upon their pulleys, and thus causing irregularities in the rotation of the winding-reels.

$q\ q$ are feed-rollers, which are mounted in brackets attached to the frame $a$. These rollers are rotated from the shaft $d'$ by the gearing $q'$, so that a positive feed is imparted to the card-board.

$r$ is a belt-shipper for moving the driving-belt onto the fast or loose pulley for starting or stopping the machine.

In order to stop the machine automatically in case the card-board to be divided should not be in a continuous length or should tear, I provide the following mechanism.

$s$ is a roller, around which the card-board passes after leaving the roll, and before entering the first pair of feed-rolls. This roller is supported at the free end of two lever-arms, $s'$, pivoted upon the bar $s^2$, and, with its supporting-levers, is normally held in a raised position by the card-board, as shown in Fig. 2. Upon the bar $s^2$ is mounted a lever, $t$, having at its free end a hook, $t'$, into which the roller $s$ is adapted to fall, as shown in dotted lines in Fig. 4, when the continuity of the card-board is broken. The end of this lever engages in a notch, $t^2$, in the under side of the shipper-bar, and is held therein by means of a spring, $t^3$.

$u$ is a friction-wheel keyed upon the driving-shaft $f$, and $u'$ is a brake-shoe which bears against this friction-wheel in stopping the machine. This shoe is pivoted to a bracket, $a'$, on the frame $a$, and is provided with a stud or projecting portion, $u^2$, against which an inclined surface, $r'$, is adapted to act to oscillate the said shoe. $r^2$ is a spring, which is designed to draw the shipper-bar $r$ in the direction of the arrow, Fig. 5.

In starting the machine the shipper-bar is pushed forward so as to extend the spring $r^2$ until the end of the lever $t$ enters the notch $t^2$, and the driving-belt is shifted onto the fast pulley $g'$, as shown in Fig. 5. This forward movement of the shipper-bar causes the inclined surface $r'$ to impinge against the stud $u^2$ and move the shoe $u'$ out of contact with the wheel $u$ to the position shown in Fig. 4. When the parts of the mechanism are in this position, the machine will operate uninterruptedly. If for any reason the continuity of the card-board from the roll $c$ should be broken, the roller $s$, owing to its weight, would drop into the position shown in dotted lines in Fig. 4, so as to draw the end of the lever $t$ out of the notch $t^2$. When this is accomplished, the spring $r^2$ contracts and moves the shipping-bar in the direction of the arrow, so as to shift the belt onto the loose pulley $g^2$. At the same time the inclined surface $r'$ moves out of contact with the stud $u^2$, so that the shoe $u'$, under the action of the spring $u^3$, is brought into contact with the wheel $u$, thus braking the said wheel and stopping the machine.

The operation of the improved machine or apparatus is as follows, that is to say: The card-board, as it leaves the roll $c$, passes around the roller $s$, thence up and between the first pair of feed-rollers $q$, and thence between the cutters $c\ c'$, where the card-board is cut longitudinally. After leaving the cutters the strips of card-board pass between the second pair of rollers $q$, on issuing from which every alternate strip is conducted to the reel $h$ and wound upon a disk, $j$. The intermediate strips are conducted to the reel $h'$ and wound upon the disks of that reel. When a sufficient quantity of card-board is wound upon the reels, the latter can be removed, the caps of the bearings of the shafts $i\ i'$ being fitted in a similar manner to the caps $b^2$ of the shaft $b$. By removing the nuts and springs $o'\ o$ the disks, with the strips of card-board wound thereon, and the division-pieces $k$ can be removed.

In order to adjust the position of the roll $c$ of card-board so that the edges of the same are in line with the cutters, I provide mechanism for moving the shaft $b$ laterally. This mechanism, as shown in the drawings, consists of a screw-nut, $v$, attached to one end of the shaft $b$. Through this nut passes a screw, $w$, the inner end of which is swiveled in the frame $a$, while the outer end of the screw is adapted to rotate in a supporting-bracket, $y$, bolted to the frame $a$. The construction is such that while the screw can rotate it is held against longitudinal movement, and as the screw engages the nut $v$, which is attached to the shaft $b$, Figs. 1 and 3, it is obvious that the rotation of the screw will cause the nut to ride thereupon back and forth, thereby correspondingly moving the shaft lengthwise, for which purpose the opposite end of the shaft is free to move longitudinally in its bearing. The screw is provided with a hand-wheel, $x$, by which to turn it.

What I claim is—

1. In a machine for cutting card-board or the like into strips, the combination of two rotary shafts carrying circular cutters and geared together, and the feeding-rolls $q$, with the shafts $i\ i'$, carrying core-pieces $j$ and guides $k$, the springs $o$ on the shafts, and the nuts $o'$ on the shafts, substantially as and for the purposes described.

2. The combination, with the cutters $c\ c'$ and the winding-reels $h\ h'$, of the belt-shipper, the roller $s$, carried by the arms $s'$, and the lever $t$, having the hook $t'$ and adapted to engage in a notch in the belt-shipper bar $r$, substantially as and for the purpose described.

3. The combination of the shaft $b$, for carrying a roll of paper, card-board, or similar material, the cutting mechanism consisting of two rotary shafts, $d'\ d^2$, geared together and carrying circular cutters $d$, whose edges overlap each other and which are separated by washers $d^3$, rollers $q\ q$, for feeding said material between said cutters, and winding mechanism consisting of shafts $i\ i'$, each carrying core-pieces $j$ and guides $k$, held in frictional contact with each other by springs $o$, whose tension can be regulated by nuts $o'$, substantially as and for the purpose set forth.

In testimony whereof I have hereunto signed my name in the presence of two subscribing witnesses.

WALTER RATHBONE BACON.

Witnesses:
DAVID YOUNG,
W. R. LOWMAN.